United States Patent

[11] 3,619,010

[72] Inventor Alan D. Foster
    Adrian, Mich.
[21] Appl. No. 832,756
[22] Filed June 12, 1969
[45] Patented Nov. 9, 1971
[73] Assignee The Dayton Steel Foundry Company
    Dayton, Ohio

[54] PLASTIC HUB CAP WITH INTEGRAL MOUNTING TABS
    2 Claims, 6 Drawing Figs.
[52] U.S. Cl. ............................................. 301/37 P,
                                                  301/108 R
[51] Int. Cl. ............................................. B60b 7/06
[50] Field of Search ............................. 301/108, 37

[56] References Cited
    UNITED STATES PATENTS
    2,015,352  9/1935  Reid ........................... 301/108 R
    2,061,145  11/1936  Duffy ......................... 301/108 R
    2,196,990  4/1940  Hunt ........................... 301/108 X
    3,220,776  11/1965  Golden ...................... 301/108 R
    3,361,483  1/1968  Main ........................... 301/37 P Primary Examiner—Richard J. Johnson
Attorney—Marechal, Biebel, French and Bugg ABSTRACT: An all-plastic hub cap for a pressed steel wheel has a body formed exclusively of high impact resistant molded plastic material, an axially disposed annular seating face integrally formed with the body and adapted to engage the mounting flange of the wheel, and means defining a plurality of angularly spaced-apart mounting tabs integrally formed with the body and proportioned to be received axially inwardly of the mounting flange. Each mounting tab has an axially inwardly and radially outwardly extending surface which defines with the seating face an annular depression adapted to receive the mounting flange to form an interference fit therewith.

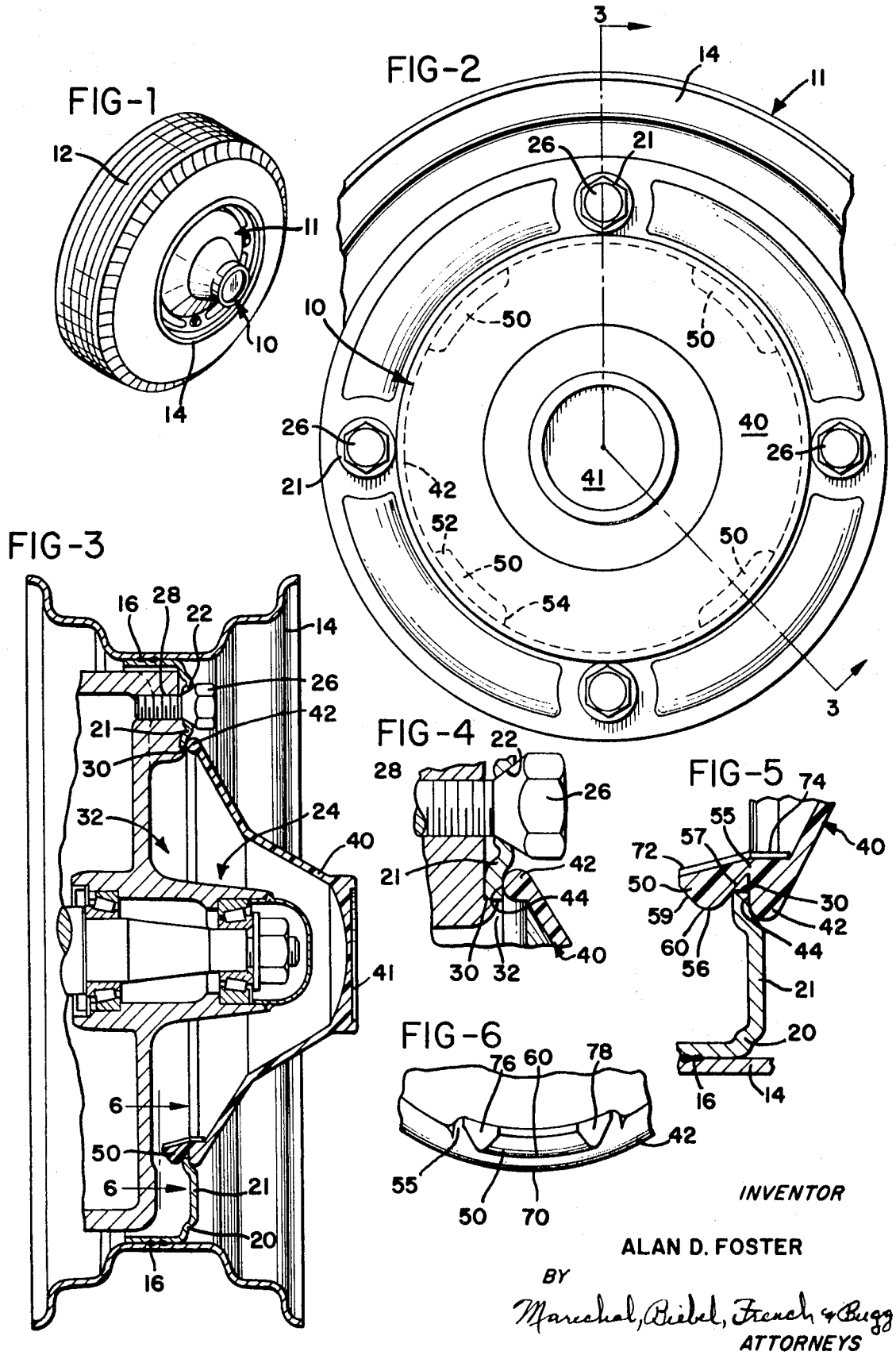

PLASTIC HUB CAP WITH INTEGRAL MOUNTING TABS

BACKGROUND OF THE INVENTION

All-metal hub caps have long been used because of their durability and impact resistance to road shocks and gravel and other objects of the highways which are thrust against them. It is a wide spread opinion that the hub of a wheel should be guarded by metal both for appearance and for protection. Heretofore, the hub caps which have been widely used for camping trailers, mobile homes, and the like have been constructed of metal, usually chromium or nickel plated sheet metal.

Metal hub caps are obviously very capable of serving the purpose for which hub caps are used, but suffer from the disadvantages of being costly. Metal hub caps of expensive design are generally used with correspondingly expensive automobiles. On the other hand, however, the industries which manufacture camping trailers, mobile homes, and the like have long sought a more inexpensive hub cap because these vehicles are generally bought for their utilitarian purpose, rather than for their expensive or flashy design. However, such industries have not been willing to accept a hub cap which is significantly less durable and less attractive than metal.

SUMMARY OF THE INVENTION

The present invention is directed to providing an all-plastic hub cap for steel wheels of the type having a radially inwardly extending annular mounting flange terminating in a substantially right-angled edge defining the periphery of a central axle opening. The hub cap of the present invention includes an all-plastic body of high impact resistant molded plastic, which is somewhat lighter and substantially less expensive than metal, and means for releasably mounting the hub cap or the wheel. The hub cap may be of any desired external design.

The all-plastic hub cap is formed with an integrally molded annular rim having an axially disposed annular seating face for engaging the mounting flange adjacent the flange edge. The hub cap also includes a plurality of angularly spaced-apart axially disposed mounting tabs which extend a short distance radially arcuate of the rim and which are integrally connected to the rim by a generally axially extending elastically deformable web portion. Each of the tabs has an outer radial surface which is proportioned to be received axially inwardly of the flange edge and which is adapted to define with the seating face of the rim an annular depression for receiving the mounting flange of the wheel to form an interference fit therewith.

The outer radial surface preferably has an axially outer portion which extends from the web portion of the tab radially outwardly at an angle of approximately 45° and an axially inner portion which extends radially inwardly at an angle of approximately 45°. Thus, the outer portions of the tabs may be aligned with the mounting flange such that an inwardly directed force will cause the web portion to flex and allow the tabs to move radially and axially inwardly until the flange edge passes into the annular depression between the inner portion and the rim seating face. An interference fit is thus achieved which serves to retain the hub cap pressed tightly against the mounting flange to provide an essentially rattle proof mounting of the hub cap on the wheel.

The all-plastic body may be electroplated with chromium or the like to give the external surface the attractive appearance of expensive metal. The hub cap has essentially the same mounting characteristics and achieves essentially the same road results as metal hub caps, and has the added advantage of being less expensive to manufacture.

BRIEF DESCRIPTION OF THE DRAWING

FIG. 1 is a perspective view of a wheel and tire assembly showing a hub cap of the present invention fitted therein;

FIG. 2 is a partially broken away side elevation of the wheel and tire assembly showing the hub cap mounted on the wheel and, in dotted lines, the outline of the hub cap rim and angularly spaced apart mounting tabs;

FIG. 3 is a cross-sectional view of the wheel and hub cap taken along line 3—3 in FIG. 2;

FIG. 4 is a partially broken away enlarged cross-sectional view showing the annular rim seated against the mounting flange at a point between the mounting tabs;

FIG. 5 is a partially broken away enlarged cross-sectional view showing the mounting flange wedge between a mounting tab and the hub cap rim; and FIG. 6 is a partially broken away enlarged view of the underside of a mounting tab of the hub cap of the present invention taken along line 6—6 in FIG. 3.

DETAILED DESCRIPTION OF THE PREFERRED EMBODIMENT

The hub cap 10 of the present invention is shown in perspective in FIG. 1 mounted on a vehicle wheel 11 carrying a tire 12. More specifically in FIGS. 2 and 3, the wheel 11 includes a wheel rim 14 secured by means of welds 16 to an annular generally L-shaped mounting flange 20 having, as shown in FIG. 2, a plurality of raised mounting bosses 21 with mounting lug bores 22 therethrough. The wheel 11 is secured to a hub assembly, generally designated 24, by tightening the lugs or bolts 26 into the threaded bores 28 in the hub assembly 24 until they seat on the bosses 21.

The hub cap of the present invention is adapted to be releasably mounted on vehicle wheels of the type illustrated in FIGS. 2 and 3 which have a radially inwardly extending annular mounting flange 20 which terminates in a substantially right-angled edge 30 defining the periphery of a central opening 32 for the hub assembly 24. As shown, the edge 30 is located radially inwardly of the bolts 26, and the hub cap is adapted to be mounted on the edge 30 to cover the hub assembly 24 leaving the bolts 26 exposed. The hub cap 10 consists of a body 40 consisting exclusively of a high impact resistant molded plastic material, such as polypropylene, which may be molded in any desired external shape or appearance. Generally, the configuration of the body 40 is similar to that shown in FIG. 3 to accommodate the outwardly protruding hub assembly 24 and to form an outwardly facing surface 41 onto which the manufacturer's identification may be placed.

The hub cap body 40 includes an integrally formed annular rim 42 having an axially disposed annular seating face 44 (FIG. 4). The seating face 44 is preferably formed for circumferentially seating of the mounting flange 20 adjacent the flange edge 30. Accordingly, in the preferred embodiment, the annular rim 42 is formed as a rounded bead (FIG. 4) such that the outermost point thereof defines the annular seating face 44.

The hub cap body 40 also includes at least two integrally formed, angularly spaced apart, generally axially extending mounting tabs 50. Each tab 50 extends a short distance radially arcuately of the annular rim 42, shown in FIG. 2 in dotted lines from points 52 to 54, and has an arcuate radially outer surface 56. As shown in FIG. 2, the distance from points 52 to 54 comprises a radial span greater than 20° and less than 50° on said seating face. Each of the tabs 50 is connected to the rim 42 by a generally axially extending, elastically deformable web portion 55 and is proportioned to be received by the wheel, as shown in FIGS. 3 and 5, inwardly of the flange edge 30. This is accomplished by forming each arcuate outer radial surface 56 with an axially inclined outside face 57 which extends from the web portion 55 of the tab axially inwardly and radially outwardly at an angle of approximately 45°, as shown in FIG. 5, and with an axially inclined inside face 59 which extends from the apex 60 of the surface 56 axially inwardly and radially inwardly at an angle of approximately 45°. The inside inclined face 59 facilitates insertion of the tabs 50 within the mounting flange 20 and the axially outside inclined face 57 facilitates retention of the mounting flange 20 between the seating face 44 of the rim 42 and the axially outer portion 57 of surface 56.

The hub cap 10 is mounted on the wheel in the following manner. The tabs 50 are aligned with the periphery of the mounting flange 20 defined by the right-angled edge 30 and force is applied axially inwardly such that the inside face 59 will contact the edge 30 and be urged radially inwardly as the edge 30 moves therealong. The force will be transferred to the web portion 55 which will be elastically deformed radially inwardly. Force is applied until the edge 30 reaches the apex 60 of the surface 56 after which the radially outward bias in the tab will cause the edge 30 to slide radially inwardly on inclined outside face 57 until it seats against seating face 44. The substantially right-angled edge 30 will be pressed tightly against the seating face 44 by any residual outward bias in the tab 50. Also, the inclined outside face 57 not only serves to form an interference fit with the mounting flange 20 but also provides an inclined surface which facilitates removal of the hub cap therefrom.

The inclined inside face 59 thus acts as a guide to facilitate insertion of the tabs 50 within the mounting flange 20 and the inclined outside face 57 facilitates retention of the flange within an annular retaining space or depression defined by inclined face 57 and seating face 44. The angle of inclination of the inclined faces 57 and 59 may be varied, if desired, but 45° for both has been found satisfactory. It is also preferred that the apex 60 of surface 56 be located a short distance radially inwardly of the radial extremity 70 of rim 42, as shown in FIGS. 5 and 6, in order to facilitate movement of the flange into the retaining space and to minimize unnecessary flexing of the web portion 55.

The remaining surfaces of the tabs may be formed in any desired shape. For purposes of the preferred embodiment, however, the radially inner surfaces 72 and 74 (FIG. 5) of the tab 50 and web 55 respectively are shown as extending in a generally axial direction arcuate of the rim 42. The tabs may also be economically molded, as shown in FIG. 6, with radially spaced apart and tapered end faces 76 and 78 to give a trim appearance thereto.

The present invention thus provides an all-plastic hub cap having integrally molded securing means and having essentially no disadvantages by virtue of being constructed entirely of plastic. The biasing force of inclined face 57, in cooperation with the seating face 44, provides an essentially rattle proof mounting of the hub cap on the wheel, and at the same time prevents dust, water and grime from collecting in the general hub area of the wheel.

The all-plastic body may be metal plated to give an attractive external appearance. Additionally, the hub cap is sufficiently responsive to road shocks and temperature changes to withstand cracking or disfiguring and achieves essentially the same road results as metal hub caps, and with the added advantage of being less expensive to manufacture.

While the hub cap herein described constitutes a preferred embodiment of the invention, it is to be understood that the invention is not limited to this precise form, and that changes may be made therein without departing from the scope of the invention.

What is claimed is:

1. In combination with a pressed steel wheel having a mounting flange secured to a hub assembly by a series of bolts and extending radially inwardly from said bolts to define a substantially right-angled circular edge of a central axial opening, an improved all-plastic hub cap adapted to be mounted on said flange edge, comprising:

a body formed of high impact-resistant molded plastic material, means forming an annular seating face on said body for engaging the mounting flange radially inwardly of said bolts, means forming at least two angularly spaced-apart mounting tabs extending a short distance circumferentially arcuate of and axially inwardly from said seating face, each of said tabs being connected to said body by an integral web portion adjacent said seating face, each of said tabs being formed with an outer surface including means forming a radially inwardly extending arcuate depression axially adjacent said seating face, said web portions being elastically deformable for flexing radially inwardly to open the depressions for receiving said flange edge and thereafter to urge said flange edge against said seating face, said seating face having the general form of a rounded bead which is flattened and extends slightly radially inwardly at locations adjacent said web portions to provide flat surfaces against which said flange edge is urged by said tabs to provide a mounting of said hub cap on said wheel which is rattle proof, leaving said bolts exposed for visual inspection.

2. The all-plastic hub cap defined in claim 7 wherein said short circumferentially arcuate distance comprises a radial span greater than 20° and less than 50° on said seating face.

* * * * *